Nov. 17, 1959   W. O. TODD   2,913,590
PROTECTIVE DEVICE FOR VEHICLE ELECTRIC EQUIPMENT
Filed Sept. 10, 1958
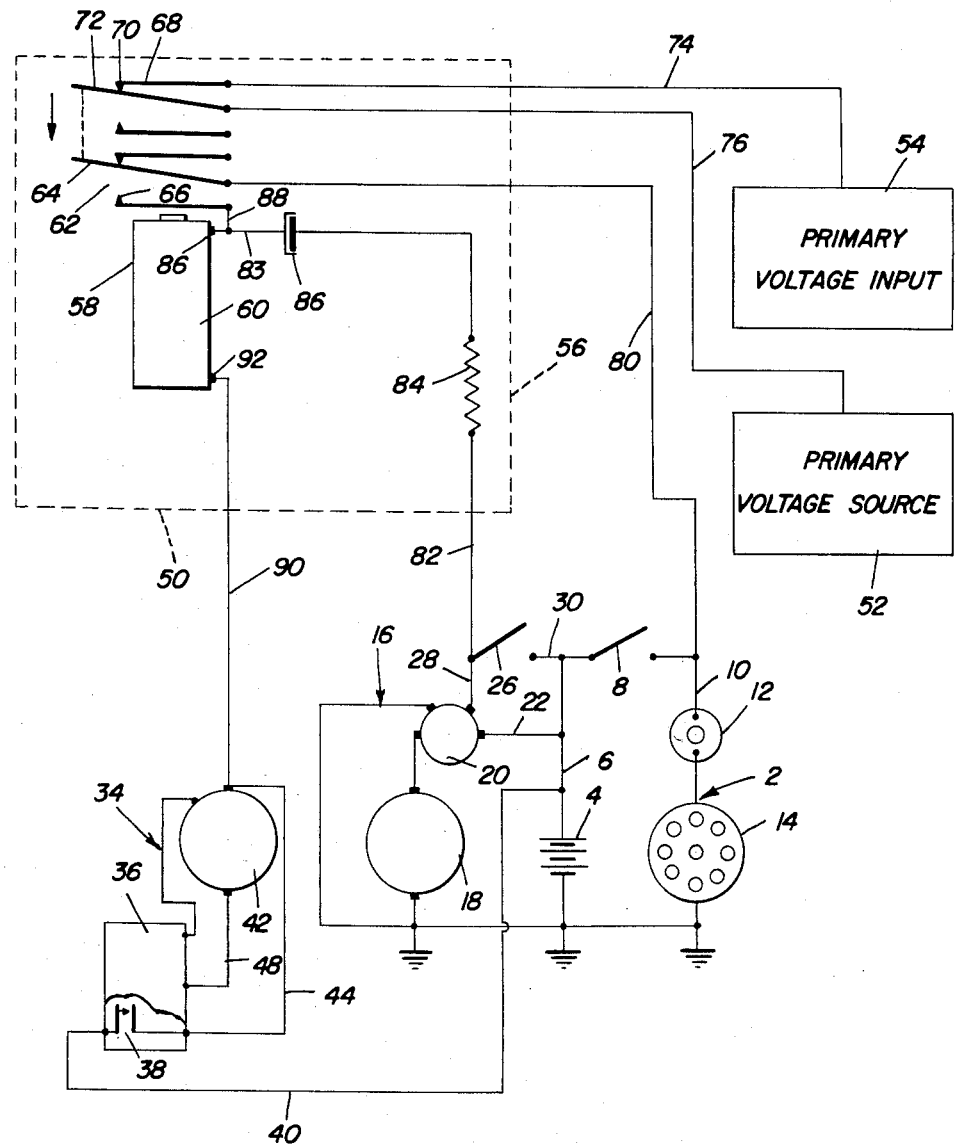
William O. Todd
INVENTOR.

United States Patent Office 2,913,590
Patented Nov. 17, 1959

2,913,590

PROTECTIVE DEVICE FOR VEHICLE ELECTRIC EQUIPMENT

William O. Todd, Pauls Valley, Okla.

Application September 10, 1958, Serial No. 760,126

5 Claims. (Cl. 307—10)

This invention relates to protective devices and more particularly to a protective device for automatically protecting motor vehicle electric equipment during engine starting in the vehicle.

An object of the invention is to provide a mechanically simple electromagnetic device which automatically disconnects various and sundry electrical equipment, for instance a radio, from its voltage source at the instant that the starter motor circuit of the motor vehicle is energized. The electric circuit containing the equipment that is to be protected, remains open until a normally open electromagnetic switch is reset by a reset switch or preferably by a bucking voltage obtained from the generator circuit of the motor vehicle.

In one application of the invention the ignition circuit, starter motor circuit and generator circuits are used to actuate an electromagnetic switch by impulse operation as the ignition switch and starter switch respectively are closed either simultaneously or successively as in most motor vehicle systems, after which the electromagnetic switch is permitted to return to its normal position by means of a bucking voltage applied in the coil of the electromagnetic switch as voltage builds up in the generator circuit. Accordingly, no special push buttons, switches or the like requiring additional attention of the motor vehicle operator, are present. The entire function of the protective device takes place automatically in response to the normal functions of the ignition circuit, starter motor circuit and generator circuits which are now and which have been for a number of years standard equipment in all automotive vehicles.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The figure is a diagrammatic view showing a conventional ignition circuit, a conventional starter motor circuit and a conventional generator-voltage regulator circuit of a motor vehicle provided with a protective device for motor vehicle electric equipment.

In the accompanying there are several conventional circuits in motor vehicles. The selected circuits are those found in General Motors automobiles and trucks. Other manufacturers' makes of motor vehicles have circuits which are essentially the same as the illustrated circuits and it is understood that the principles of the invention are applicable with any manufacturer's make of motor vehicle using standard ignition, starter and generator circuits.

Ignition circuit 2 has battery 4 as a source of electric potential. One side of the battery is connected to ground and the other side has a conductor 6 with which ignition switch 8 is operatively connected. Conductor 10 is operatively connected with ignition switch 8 and with ignition coil 12 and distributor 14 which goes to ground.

The schematic has a simplified representation of the three circuits.

The second of the circuits identified in the drawing is the starter motor circuit 16. Starter motor 18 is shown connected to ground and to a terminal of the starter motor solenoid 20, the solenoid having another terminal which is connected to ground. A lead 22 is attached to a third terminal of the solenoid 20 and to the high side of battery 4 by way of conductor 6. Starter switch 26 is connected between the final terminal of solenoid 20 by way of wire 28 and conductor 30. Although starter switch 26 and ignition switch 8 are shown independent of each other, most modern vehicles have the two switches mechanically connected so that the ignition switch operates first and then the starter switch in response to rotation of a key in a key controlled combined ignition and starter switch assembly.

The third conventional circuit is the generator circuit 34. Voltage regulator 36 has four terminals identified as field, ground, armature and battery terminals. Among the other components of the regulator 36 is a cut out 38. Wire 40 extends from the battery terminal and also cut out 38 of relay 36 and is attached to the high side of battery 4. Generator 42 has its field terminal attached to the field binding post of regulator 36. The armature of the generator is connected by wire 44 to the armature terminal of the generator and the armature binding post of the regulator 36, this armature binding post also connecting with the cut out 38. The armature of the generator has its ground connection established by conductor 48 which goes from the generator to the ground binding post of voltage regulator 36.

Since the equipment that may be protected by the protective device 50 is subject to wide variation, there is a diagrammatic representation of a primary voltage source 52 and primary voltage input 54. Whatever equipment is to be protected is operatively connected with the primary voltage input 54, and this obtains its potential from the voltage source 52. Protected equipment is any equipment of an electrical nature but will ordinarily be radio apparatus such as a radio transmitter, a radio receiver or constabulary speed detection equipment.

Protective device 50 may be contained in a small casing 56 or otherwise packaged. When in a casing, the casing contains an electromagnetically operated switch 58. This switch is constructed of a coil 60 and a normally open switch section 62 having a movable contact 64 and a fixed or stationary contact 66. Equipment control switch 68 is a normally closed switch including a fixed contact 70 and a movable contact 72. Movable contacts 64 and 72 are mechanically connected together so that they operate in unison. Cables 74 and 76 are attached respectively to the primary voltage input 54 and the fixed contact 70, and the primary voltage source 52 and the movable contact 72.

An electrical conductor identified as first conductor 80, is operatively connected with the ignition circuit 2. The connection is made in such a manner that ignition switch 8 controls the flow of current through conductor 80, for instance by having conductor 80 attached to conductor 10 thereby placing the ignition switch 8 in series with battery 4 and between conductor 80 and battery 4. The first conductor 80 is connected with the movable contact 64 of the normally open switch 62. Conductive means are connected with the starter motor circuit and with the coil 60 and fixed contact 66. The connection between these conductive means and the starter motor circuit is made so that the starter switch 26 controls the flow of current through the conductive means. Therefore, lead 82 of the conductive means is secured to a terminal of the starter switch 26 and on the side of the switch arm which will place starter switch 26 in series with the battery 4. Damping resistor 84 is connected in lead 82 and in series with capacitor 86. One side of the capacitor is attached to a part of lead 82 and the other side of the capacitor is attached by another part 83 of lead 82 to one of the terminals 86 of coil 60. Jumper 88 is connected between the capacitor and terminal 86 to the fixed contact 66.

Generator circuit 34 is operatively connected with coil 60 by a conductor identified as second conductor 90 secured at one end to terminal 92 of coil 60 and secured at the other end to the armature connection of generator 42. Second conductor 90, the armature of the generator, cut out 38 and conductor 40 are used to apply a bucking voltage to the coil 60, as will be described in detail subsequently.

In starting the engine of a motor vehicle ignition switch 8 is closed and remains closed. The starter switch is momentarily closed and when the engine begins to function, the starter switch is opened. The functioning of circuits 2, 16 and 34 in the motor vehicle are described only to the extent that they affect protective device 50. When ignition switch 8 is closed, battery voltage is applied through first conductor 80 to movable contact 64. When starter switch 26 is closed, battery voltage is applied through lead 82, damping resistor 84 and to one side of capacitor 86. This draws charging current through the coil 60 which has one end connected to ground through second conductor 90 and the armature of generator 42. As the capacitor charges the coil 60 of magnetic switch 58 is energized thereby closing the normally opened switch 62, and battery voltage is applied directly across the coil 60 by way of movable contact 64, fixed contact 66 and jumper 88. Note that closing of normally opened switch 62 causes equipment control switch 68 to open since switches 62 and 68 are mechanically coupled.

It follows that when starter switch 26 is closed the magnetic switch 58 is impulse operated through the capacitor and in operating it becomes locked electrically by means of battery voltage applied directly to the coil 60 by way of the contacts of switch 62. The magnetic switch remains locked in electrically for a brief period. One way of de-energizing the coil 60 would be by use of a shorting switch that is manually operated, but the preferred way is to have means responsive to the voltage output of the generator in generator circuit 34 for achieving this. As the vehicle engine increases its r.p.m. and the generator 42 has its armature turning at increasing speed, the voltage will be built up quickly to buck out the voltage applied to coil 60 by way of jumper 88. The normal functioning of circuit 34 has cut out 38 closed thereby connecting the armature of generator 42 to the high side of battery 4, for instance through conductor 40. Since the second conductor 90 is connected with the armature binding post of the generator, the closing of cut out 38 metallically shorts out the coil of magnetic switch 58 permitting switches 62 and 68 to return to their normal positions that is, switch 62 returning to the open position and switch 68 returning to the closed position. The closing of switch 62 operatively connects the primary voltage source 52 with the primary voltage input 54 so that the protective equipment may now function.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A protective device for electrical equipment of a motor vehicle which has an ignition switch, a starter switch, a starter motor circuit, an ignition circuit and a generator circuit, a battery to energize said circuits, said switches controlling said circuits, said protective device comprising a normally open switch having an operating coil provided with a pair of terminals, a fixed contact and a movable contact which is engaged with said fixed contact in response to energization of said coil, a first conductor connected with said ignition circuit and controlled by said ignition switch, said first conductor connected to said movable contact, a normally closed electrical equipment control switch mechanically connected with said movable contact and opened when said contacts move into engagement, conductive means operatively connected with said starter motor circuit and controlled by said starter switch for applying first voltage to a terminal of said coil and thereby simultaneously closing said normally open switch and opening said equipment control switch, and a second conductor connected with said generator circuit and the other terminal of said coil to apply a bucking voltage to said coil to thereby buck the first voltage and have said normally open switch return to the open position and said equipment control switch return to its normally closed position.

2. A protective device for electrical equipment of a motor vehicle which has an ignition switch, a starter switch, a starter motor circuit, an ignition circuit and a generator circuit, a battery to energize said circuits, said switches controlling said circuits, said protective device comprising a normally open switch having an operating coil provided with a pair of terminals, a fixed contact and a movable contact which is engaged with said fixed contact in response to energization of said coil, a first conductor connected with said ignition circuit and controlled by said ignition switch, said first conductor connected to said movable contact, a normally closed electrical equipment control switch mechanically connected with said movable contact and opened when said contacts move into engagement, conductive means operatively connected with said starter motor circuit and controlled by said starter switch for applying first voltage to a terminal of said coil and thereby simultaneously closing said normally open switch and opening said equipment control switch, said conductive means including a lead having a capacitor between one terminal of said coil and said starter switch so that upon closing of said starter switch battery voltage is applied to one side of said capacitor which draws current through said coil, a jumper connected between the opposite side of said capacitor and said fixed contact and thereby applying battery voltage from said first conductor to said coil so that when said starter switch is closed said normally open switch is impulse actuated to the closed position through said capacitor and in operating locks closed electrically by means of battery voltage applied directly to said coil through said jumper.

3. A protective device for electrical equipment of a motor vehicle which has an ignition switch, a starter switch, a starter motor circuit, an ignition circuit and a generator circuit, a battery to energize said circuits, said switches controlling said circuits, said protective device comprising a normally open switch having an operating coil provided with a pair of terminals, a fixed contact and a movable contact which is engaged with said fixed contact in response to energization of said coil, a first conductor connected with said ignition circuit and controlled by said ignition switch, said first conductor connected to said movable contact, a normally closed electrical equipment control switch mechanically connected with said movable contact and opened when said contacts move into engagement, conductive means operatively connected with said starter motor circuit and controlled by said starter switch for applying first voltage to a terminal of said coil and thereby simultaneously closing said normally open switch and opening said equipment control switch, said conductive means including a lead having a capacitor between one terminal of said coil and said starter switch so that upon closing of said starter switch battery voltage is applied to one side of said capacitor which draws current through said coil, a jumper connected between the opposite side of said capacitor and said fixed contact and thereby applying battery voltage from said first conductor to said coil so that when said starter switch is closed said normally open switch is impulse actuated to the closed position through said capacitor and in operating locks closed electrically by means of battery voltage applied directly to said coil through said jumper, and a second conductor connected with said generator circuit and the other terminal of said coil to apply a voltage to said coil for bucking out the first voltage applied to said coil whereby said equipment control switch and normally open switch return to their normal positions.

4. A protective device for electrical equipment of a motor vehicle which has an ignition switch, a starter switch, a starter motor circuit, an ignition circuit and a generator circuit, a battery to energize said circuits, said switches controlling said circuits, said protective device comprising a normally open switch having an operating coil provided with a pair of terminals, a fixed contact and a movable contact which is engaged with said fixed contact in response to energization of said coil, a first conductor connected with said ignition circuit and controlled by said ignition switch, said first conductor connected to said movable contact, a normally closed electrical equipment control switch mechanically connected with said movable contact and opened when said contacts move into engagement, conductive means operatively connected with said starter motor circuit and controlled by said starter switch for applying first voltage to a terminal of said coil and thereby simultaneously closing said normally open switch and opening said equipment control switch, said conductive means including a lead having a capacitor between one terminal of said coil and said starter switch so that upon closing of said starter switch battery voltage is applied to one side of said capacitor which draws current through said coil, a jumper connected between the opposite side of said capacitor and said fixed contact and thereby applying battery voltage from said first conductor to said coil so that when said starter switch is closed said normally open switch is impulse actuated to the closed position through said capacitor and in operating locks closed electrically by means of battery voltage applied directly to said coil through said jumper, said generator circuit having a cut out connected to the high side of said battery and a generator provided with an armature connected to ground and said cut out, a second conductor connected to the other terminal of said coil and said armature so that said normally open switch remains locked closed electrically until the output of the generator is high enough in voltage to buck out said first voltage applied to said coil at which said generator cut out closes and connects the armature with the high side of said battery thereby metallically shorting out said coil and permitting said normally open switch and said equipment switch to return to their normal positions.

5. A protective device for electric equipment in a motor vehicle which has a battery and electrical circuits operatively connected with the battery, said protective device comprising an electromagnetic switch having a coil, a movable contact and a fixed contact, means connected with the vehicle circuit and including a resistor and capacitor for impulse excitation of said coil to move said movable contact, an equipment control switch operatively connected with said electromagnetic switch and operated in unison with said electromagnetic switch, conductive means also connected with said vehicle circuit and with said coil for electrically locking said coil after said impulse actuation thereof, and additional conductive means connected with said coil and responsive to voltage generation in said vehicle circuit for bucking the first mentioned voltage and thereby releasing said contacts of said electromagnetic switch for return of said contacts to the normal position and consequently for permitting said equipment control switch to return to its normal position.

References Cited in the file of this patent
UNITED STATES PATENTS
2,449,338    Summersett _____ Sept. 14, 1948